(12) United States Patent
Kögel

(10) Patent No.: US 8,714,390 B2
(45) Date of Patent: May 6, 2014

(54) CONTAINER FOR OPERATING MEDIA OF MOTOR VEHICLES

(75) Inventor: Alexander Kögel, Ulm (DE)

(73) Assignee: Magna Steyr Fuel Systems GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/422,287

(22) Filed: Mar. 16, 2012

(65) Prior Publication Data
US 2012/0168446 A1 Jul. 5, 2012

Related U.S. Application Data

(63) Continuation of application No. 12/160,405, filed as application No. PCT/EP2007/000089 on Jan. 8, 2007, now Pat. No. 8,181,808.

(30) Foreign Application Priority Data

Jan. 10, 2006 (DE) .......................... 10 2006 001 428
Nov. 15, 2006 (DE) .......................... 10 2006 054 208

(51) Int. Cl.
*B65D 6/00* (2006.01)
*B65D 8/00* (2006.01)
*B65D 1/40* (2006.01)
*B65D 8/04* (2006.01)

(52) U.S. Cl.
USPC ..... 220/62.22; 220/4.12; 220/4.13; 220/4.14; 220/553; 220/555; 220/562; 220/563; 220/564; 29/527.2

(58) Field of Classification Search
USPC ............ 220/4.12–4.14, 62.22, 524, 553, 555, 220/562–564; 29/428, 447, 458, 527.1, 29/527.2; 224/400
See application file for complete search history.

(56) References Cited

U.S. PATENT DOCUMENTS

| | | |
|---|---|---|
| 2,316,116 A | 4/1943 | Thompson et al. |
| 4,874,104 A | 10/1989 | Klammer et al. |
| 5,567,296 A | 10/1996 | Luch |
| 6,276,201 B1 | 8/2001 | Gette |
| 2003/0209550 A1 | 11/2003 | Potter |
| 2005/0127078 A1* | 6/2005 | Vorenkamp et al. .......... 220/562 |
| 2005/0173433 A1 | 8/2005 | Spahr |
| 2005/0229992 A1* | 10/2005 | McKeen et al. ............... 138/141 |

FOREIGN PATENT DOCUMENTS

| | | |
|---|---|---|
| DE | 199 30 347 A1 | 1/2001 |
| GB | 2 390 582 A | 1/2004 |
| WO | WO 91/09732 | 7/1991 |

* cited by examiner

*Primary Examiner* — Fenn Mathew
*Assistant Examiner* — Madison L Poos
(74) *Attorney, Agent, or Firm* — Paine Hamblen, LLP

(57) ABSTRACT

A container for operating media of motor vehicles which is chemically stable both in respect of the fuel carried and in respect of additives.

21 Claims, 2 Drawing Sheets

CONTAINER FOR OPERATING MEDIA OF MOTOR VEHICLES

RELATED PATENT DATA

The present application is a Continuation Application of U.S. application Ser. No. 12/160,405 and which was filed on Sep. 30, 2008, and which further claims priority from PCT/EP2007/000089 and which was filed on Jan. 8, 2009; German patent application Serial No. 10 2006001 428.6, and which was filed on Jan. 10, 2006; and German patent application Serial No. 10 2006054 208.8 and which was filed on Nov. 15, 2006.

FIELD OF THE INVENTION

The invention relates to a container for operating media of motor vehicles.

BACKGROUND OF THE INVENTION

Such containers, in particular fuel containers, are conventionally found as build-on parts, for example in commercial vehicles, where they are often implemented as riveted or welded containers or, alternatively, as plastic containers.

Precisely in the commercial vehicle sector, however, in recent years, because of increasing requirements as to the environmental compatibility of such vehicles, a need has arisen for containers for operating media, the function of which goes beyond that of a conventional fuel tank or the like. Thus, for example, it has recently been necessary, within the framework of measures for the reduction of nitrogen oxides in diesel exhaust gases, to use urea in the exhaust system of commercial vehicles. This has given rise to a need for tanks which are suitable for carrying the chemically aggressive urea required.

SUMMARY OF THE INVENTION

The object on which the present invention is based, therefore, is to specify a container for operating media of motor vehicles, which is chemically stable both in respect of the fuel carried and in respective of additives.

According to the invention, this object is achieved in that the container for the operating media of motor vehicles is implemented in that it has a carrying structure and the inside of the carrying structure is covered at least partially with a plastic sintered layer. In this case, the carrying structure as, for example, a metal, on which the thin plastic sintered layer is applied. The plastic sintered layer may be provided, for example, in that, after the shaping of the carrying structure, the container as a whole is heated, and a plastic powder is subsequently introduced into its interior, where it melts on the hot carrying structure and consequently forms the layer mentioned.

One advantage of this arrangement is that, because of the rigidity of the carrying structure due to the choice of material, the carrying structure can be chosen to be thin, and also the plastic sintered layer, as a layer of small thickness, fulfils its function to a sufficient extent. Furthermore, as compared with conventional solutions in which a finished plastic container is introduced into an outer stabilizing sheath, there is the advantage that the interior of the outer sheath, hence, in the present case, of the carrying structure of the container, can be utilized substantially more effectively. Overall, the proposed container constitutes a rigid and at the same time lightweight structure.

In addition, the proposed solution makes it possible to dispense virtually completely with additional devices for fixing the plastic to the inside of the carrying structure, since a firm connection is already made by virtue of the sintering process.

Thus, in particular, fuel containers for motor vehicles and also containers for fluid or nonfluid fuels or operating media, such as hydraulic fluid, biodiesel or urea, can be provided. One advantage of the plastic coating of the container inside is in this case that the plastic layer is usually chemically inert, that is to say it is not attacked by the operating medium stored in the container. Consequently, the widespread problem of the leaking of metal, in particular of aluminum ions, out of the aluminum carrying structure of the container due to the sometimes aggressive operating medium, such as, in particular, urea, is effectively counteracted.

Furthermore, sintering on the plastic sintered layer directly has considerable production benefits. Since the carrying structure itself is used as a sintering tool, virtually any desired container shapes can be implemented at low outlay even for small quantities, so that the containers according to the invention can be adapted in a simple way to the most diverse possible frame geometries, for example for special vehicles.

Moreover, the solution according to the invention affords a simple possibility of implementing integrated multiple, in particular double containers. Integrating the containers within a carrying structure has in this case the advantage that not every part container has to be fastened separately to the vehicle frame by means of two or more brackets, but, instead, the integrated container can be attached as a whole to a vehicle frame by means of only two brackets.

The plastic sintered layer inside the container may be further stabilized mechanically, for example, in that the container has one or more undercuts on its inside, where appropriate due to the manufacturing process. The undercuts mentioned in this case have the effect that they cause an additional mechanical stabilization of the plastic sintered layer, so that the plastic sintered layer is effectively prevented from coming loose from the inside of the carrying structure. As a result of this, the plastic sintered layer can be chosen to be thinner than would be possible without undercuts; a further weight saving can thereby be implemented as a consequence.

The undercuts may be implemented, particularly as a secondary effect, in the production of the structure of the container: in the case of a container composed of a plurality of segments, the required undercuts arise virtually automatically at the joints which, for example, are riveted or else are welded, for example by means of an orbital seam. Furthermore, the undercuts can also be implemented in that passage orifices through the carrying structure are formed with a suitable geometry. Passage orifices are to be understood in this context as meaning, in particular, the orifice for the filler neck or an orifice for introducing a filling level sensor into the tank. The undercut may be formed in a simple way by a peripheral flange spaced apart from the inside of the carrying structure or by a ribbed structure. Moreover, it is conceivable to provide a neck which, for example, widens conically in the direction of the interior of the container, thereby likewise effectively making it difficult to pull the plastic sintered layer inwards.

A further measure for improving the adhesion between the plastic sintered layer and the inside of the carrying structure may be achieved, in particular, in that an additional adhesive layer is introduced between the plastic sintered layer and the inside of the carrying structure. The layer thickness necessary for the mechanical stability of the plastic sintered layer may thereby be further reduced.

An advantageous choice for the plastic sintered layer is a high-pressure polyethylene which has the required chemical inertness with respect to the operating media to be carried; an appropriate thickness of the sintered layer has proved to be approximately 1-25 mm, in particular approximately 2 to 3 mm or 5 to 10 mm.

According to a possible method for producing said container, first, the carrying structure consisting of metallic individual parts is assembled, for example welded. The structure thus assembled is subsequently heated, and the plastic sintered material is introduced into the interior of the carrying structure, where it is precipitated on the inside of the carrying structure, melts on and thus forms the desired plastic sintered layer.

In order to achieve a uniform distribution of the plastic sintered material in the interior of the container, the container may be kept in motion, in particular in rotation, during the sintering process.

As an intermediate step after the heating of the carrying structure and before the introduction of the plastic sintered material, it has proved appropriate to apply an additional adhesive layer to the inside of the carrying structure. Alternatively, the adhesive layer may also be applied to the individual segments even before the carrying structure is assembled. It is likewise conceivable, for example in the case of riveted containers, also to apply the plastic sintered layer even before the carrying structure is assembled; that is to say, essentially, in the abovementioned method, to shift the first step, to be precise the assembly of the individual segments, to end of the process. Particularly in the case of riveted carrying structures, this procedure is appropriate, since, in this case, the already coated structure does not have to be heated once again, as would be the case, for example, if the container were assembled by welding.

In the cases where the plastic sintered layer is introduced into the container after the assembly of the carrying structure, it is recommended to introduce the plastic material through an orifice, provided in any case, of the carrying structure such as, for example, the filler neck. It is likewise conceivable to introduce the plastic material through a further orifice into the interior of the container.

An advantageous temperature range which has proved appropriate for sintering on the plastic sintered layer is approximately 160 to 200° C.

In a further advantageous embodiment of the invention, the container has a first part container, the inside of which is covered at least partially with a plastic sintered layer. This first part container has adjoining it at least one second part container which is designed to be closed off with respect to the first part container. The two part containers are connected to one another by means of a weld seam, the weld seam running along a projection on the first part container at a spacing of at least 100 mm, in particular at least 200 mm.

The first part container may be, in particular, a urea container which is welded to the second part container designed as a fuel container. The abovementioned projection of the first part container has in this case the effect that the weld seam, by means of which the two containers are connected to one another, has a sufficiently large spacing from the internally coated first part container to avoid melting of and consequently damage to the plastic sintered layer inside the first part container during the welding operation. For a version of the two containers consisting of aluminum with a wall thickness of approximately 2 mm, a spacing of the weld seam of approximately 150 mm from the first part container has proved to be advantageous; spacings of 0 to 3000, in particular of 0 to 1000 mm, may be envisaged, depending on the welding technology used.

Furthermore, the container may have a push-in element which extends through the carrying structure into the interior of the container, the push-in element being covered at least partially by the plastic sintered layer. The push-in element may be, for example, a capacitive or mechanical filling level sensor, a heating element or a combined element consisting of a filling level sensor and of a heating element. A push-in element of this type may be used, in particular, for heating a first part container designed as a urea container. Heating may in this case be implemented as electrical resistance heating or else as cooling water heating.

One problem in using a push-in element in urea containers is that, in cases where solid crystals are formed at low temperatures of the urea, such push-in elements are exposed to considerable mechanical loads which lead to a distortion or, in an extreme case, to a destruction of the push-in element. This risk can be effectively counteracted in that, in the region of that end of the push-in element facing the interior of the container, in particular at a spacing of approximately 5-10 mm from the push-in element, an auxiliary structure is arranged, by means of which a variation in position or a deformation of the push-in element is counteracted.

The result of said spacing of the auxiliary structure from the push-in element is that, under the oscillations occurring during normal driving, no impact of the push-in element against the auxiliary structure occurs; the auxiliary structure merely prevents excessive deformations or variations in position of the push-in element.

BRIEF DESCRIPTION OF THE DRAWINGS

An exemplary embodiment of the invention is described basically below with reference to FIGS. 1 and 2.

DETAILED DESCRIPTION OF THE INVENTION

Figure 1:
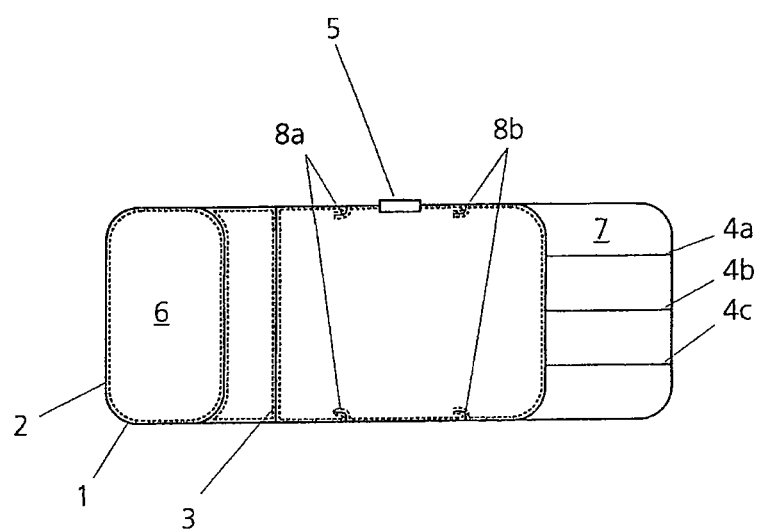

FIG. 1 shows a fuel container for commercial vehicles with a carrying structure 1 and a plastic sintered layer 2 applied to the inside of the carrying structure 1 and with a filler neck 5. The plastic sintered layer 2 in this case has a thickness of approximately 2 to 3 mm. In the present exemplary embodiment, it covers the entire inner surface of the vehicle tank, in particular also the surface of the baffle 3 and of the urea container 6 designed as a separate container.

By means of the peripheral undercuts 8a and 8b which are likewise covered by the plastic sintered layer 2, the latter is additionally stabilized mechanically and retained against the inside of the carrying structure 1. The steps 4a, 4b, 4c are formed in an additional segment 7 of the fuel container.

Figure 2:
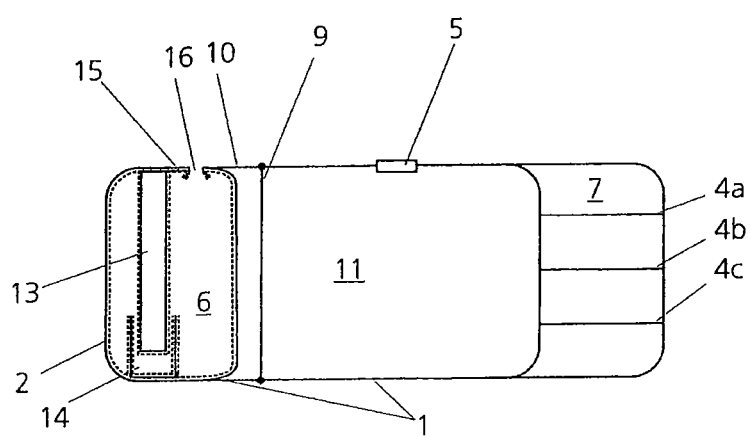

FIG. 2 shows a variant of a container, the container having the two part containers 6 and 11 which are connected to one another by means of the peripheral weld seam 9. In this case, the part container 6 is a urea container with a plastic sintered layer 2. The part container 11 is a fuel container in which a plastic inner coating is not required. Furthermore, the part container 11 has a filler neck 5. The peripheral weld seam 9 is formed with a spacing of approximately 150 mm from the internally coated part container 6 by means of the projection 10, so that a welding of the carrying structures 1 of the two part containers 6 and 11 can take place without the plastic sintered layer 2 being put at risk. The production of the container according to the invention is thereby appreciably simplified.

In this exemplary embodiment, too, the steps 4a, 4b, 4c are formed in an additional segment 7 of the part container 11.

The push-in element 13, illustrated diagrammatically in FIG. 2, which is designed as a filling level sensor with an integrated heating element is arranged in the part container 6. The push-in element 13, too, like the inside of the part container 6, is covered by the plastic sintered layer 2. Furthermore, the push in element 13 is stabilized mechanically by the auxiliary structure 14, arranged in the lower region of the part container 6 and likewise covered with the plastic sintered layer 2, in such a way that the auxiliary structure 14 is arranged at a spacing of a few millimeters from the push-in element 13 and prevents a pronounced distortion or change in position of the push-in element 13.

Moreover, the passage orifice 16 which is pierced by the filler neck 15 is located in the upper region of the part container 6. The geometry of the filler neck 15 is in this case selected such that the filler neck 15 widens in the direction of the interior of the part container 6. This affords an undercut by means of which the hold of the plastic sintered layer 2 on the inside of the part container 6 is further improved.

What I claim is:

1. A container for a source of operating media for a motor vehicle, comprising:
   a first portion of a container and which is defined by a previously assembled metal carrying structure having an inner surface and which is further defined, at least in part, by a peripheral undercut, and which is further heated to a predetermined temperature before receiving the source of the operating media;
   a sinterable material introduced into the previously assembled metal carrying structure, and following the heating of the previously assembled metal carrying structure to form a plastic sintered layer formed on, and attached to, the inner surface of the previously assembled carrying structure, and the peripheral undercut of the first portion;
   a second portion of the container which is located adjacent to the first portion of the container, and which is defined by a metal carrying structure, and wherein the first and second portions of the container are not coupled in fluid flowing relation, one relative to the other; and
   a welding seam coupling the first and second portions of the container together, and wherein the welding seam is formed at a distance from the first portion of the container, and which impedes any damage to the plastic sintered layer which is borne by the first portion of the container during a welding operation.

2. A container as claimed in claim 1, and wherein the first portion of the container encloses a source of urea.

3. A container as claimed in claim 1, and wherein the second portion of the container encloses a source of a motor fuel.

4. A container as claimed in claim 1, and wherein the source of the operating media for use with the motor vehicle comprises urea, and a motor fuel, and wherein the urea is enclosed in the first portion of the container, and the motor fuel is enclosed within the second portion of the container, and wherein the plastic sintered layer is formed of a sinterable material which is substantially chemically inert relative to the urea which is enclosed in the first portion of the container.

5. A container as claimed in claim 1, and wherein a passage orifice is formed in the metal carrying structure, and the peripheral undercut is located in a region near the passage orifice.

6. A container as claimed in claim 1, and wherein the container comprises a plurality of segments, and wherein at least one of the segments has the plastic sintered layer which is formed on, and attached to, the inner surface of the previously assembled metal carrying structure.

7. A container as claimed in claim 1, and further comprising:
   an adhesive layer positioned between the plastic sintered layer, and the inner surface of the previously assembled metal carrying structure.

8. A container as claimed in claim 1, and wherein the plastic sintered layer formed on the inner surface of the previously assembled metal carrying structure comprises a high-pressure polyethylene.

9. A container as claimed in claim 1, and wherein the plastic sintered layer formed on the inner surface of the previously assembled metal carrying structure has a thickness of about 1 to about 25 mm.

10. A container as claimed in claim 1, and wherein the previously assembled metal carrying structure comprises aluminum.

11. A container as claimed in claim 1, and wherein the peripheral undercut which is covered with the plastic sintered layer mechanically stabilizes the plastic sintered layer which is formed on, and attached to, the inner surface of the previously assembled metal carrying structure so as to substantially prevent the sintered plastic layer from becoming detached therefrom.

12. A container for a source of operating media for a motor vehicle, comprising:
    a previously assembled metal carrying structure having an inner, temporarily heated surface including a peripheral undercut, and wherein the container has a first portion, and a second portion which is coupled to the first portion, and wherein the inner, temporarily heated surface, and the peripheral undercut of the portion of the previously assembled metal carrying structure is coated, following heating, with a sinterable material which subsequently forms a plastic sintered layer which is sintered onto, and affixed to the inner surface by the heat emitted by the temporarily heated inner surface, and wherein the first portion is connected to the second portion by a weld seam which extends along a projection which is mounted on the first portion, and wherein the welding seam is formed in a manner which does not adversely effect the plastic sintered layer which is formed on the inner surface of the first portion of the container.

13. A container as claimed in claim 12, and wherein the metal carrying structure comprises aluminum, and wherein the metal carrying structure forming the first portion of the container defines an internal cavity, and further includes a push-in element which extends into the internal cavity of the metal carrying structure and which is further covered, at least in part, by the plastic sintered layer which is formed from the sinterable material.

14. A container as claimed in claim 13, and wherein the push-in element is a filling level sensor.

15. A container as claimed in claim 13, and wherein the push-in element is a heating element.

16. A container as claimed in claim 13, and wherein the push-in element has an end located within the internal cavity of the metal carrying structure, and which is defined by the inner surface thereof, and wherein an auxiliary structure is mounted within the carrying structure, and on the inner surface thereof, and which is further located at about 5 to about 10 mm from the push-in element, and wherein the auxiliary element is arranged to counteract a deformation or movement of the push-in element.

17. A container as claimed in claim 13, and wherein the peripheral undercut which is covered with the plastic sintered layer mechanically stabilizes the plastic sintered layer which is formed on, and attached to, the inner surface of the first portion of the previously assembled metal carrying structure so as to substantially prevent the plastic sintered layer from becoming detached therefrom.

18. A container as claimed in claim 17, and wherein the plastic sintered layer formed on the inner surface of the first portion of the previously assembled metal carrying structure comprises high-pressure polyethylene.

19. A container as claimed in claim 18, and wherein the plastic sintered layer formed on the inner surface of the previously assembled first portion of the metal carrying structure has a thickness of about 1 to about 25 mm.

20. A container as claimed in claim 19, and wherein the inner, temporarily heated surface of the first portion of the metal carrying structure has an elevated temperature which lies in a range of about 160 degrees C. to about 200 degrees C., and which is effective in forming the plastic sintered layer on the inner surface of the first portion of the previously assembled carrying structure from the sinterable material introduced into the metal carrying structure having the elevated temperature.

21. A container for a source of operating media for a motor vehicle, comprising:
   a first portion which is defined by a previously assembled metal carrying structure having an inner surface, and which further defines an internal cavity, and wherein the first portion of the container includes a metal projection which extends laterally outwardly relative thereto, and wherein the inner surface is further defined, at least in part, by a peripheral undercut, and wherein the previously assembled metal carrying structure is formed of a metal having a composition which is chemically reactive, at least in part, with a motor vehicle operating media having both a liquid and vapor phase, and which is received within the internal cavity, and wherein the previously assembled metal carrying structure further substantially resists a migration of either the liquid or gaseous phases of the motor vehicle operating media from the internal cavity, and into a surrounding ambient environment, and wherein the previously assembled metal carrying structure can further be readily heated to a predetermined elevated temperature before receiving the motor vehicle operating media within the internal cavity thereof;
   a sinterable material introduced into the internal cavity of the first portion of the container which has been previously assembled, and heated to the predetermined elevated temperature, and which forms a plastic sintered layer which is made integral with, and attached to, the inner surface of the previously assembled metal carrying structure, and peripheral undercut, and wherein the sinterable material which forms the subsequent plastic sintered layer is substantially chemically inert relative to the liquid or gaseous phases of the operating media of the motor vehicle, and wherein the plastic sintered layer further substantially prevents any contact between the inner surface of the previously assembled metal carrying structure, and the operating media for the motor vehicle; and
   a second portion of the container and which is fabricated of a metal, and wherein the second portion of the container does not communicate in fluid flowing relation relative to the first portion of the container, and wherein the second portion of the container is secured to the first portion of the container by a welding seam which is formed between the metal projection and the second portion of the container, and wherein the welding seam is formed at a distance which substantially prevents heat related damage to the plastic sintered layer which is formed in the first portion of the container.

\* \* \* \* \*